US010471440B2

(12) United States Patent
Eliasson et al.

(10) Patent No.: US 10,471,440 B2
(45) Date of Patent: Nov. 12, 2019

(54) CENTRIFUGAL SEPARATOR

(71) Applicant: ALFA LAVAL CORPORATE AB, Lund (SE)

(72) Inventors: Thomas Eliasson, Älvsjö (SE); Per Fonser, Enskededalen (SE)

(73) Assignee: ALFA LAVAL CORPORATE AB, Lund (SE)

( * ) Notice: Subject to any disclaimer, the term of this patent is extended or adjusted under 35 U.S.C. 154(b) by 211 days.

(21) Appl. No.: 15/524,559

(22) PCT Filed: Nov. 17, 2015

(86) PCT No.: PCT/EP2015/076841
§ 371 (c)(1),
(2) Date: May 4, 2017

(87) PCT Pub. No.: WO2016/079129
PCT Pub. Date: May 26, 2016

(65) Prior Publication Data

US 2017/0312760 A1 Nov. 2, 2017

(30) Foreign Application Priority Data

Nov. 21, 2014 (EP) .................................... 14194301

(51) Int. Cl.
*B01D 45/14* (2006.01)
*B01D 45/16* (2006.01)
(Continued)

(52) U.S. Cl.
CPC ................ *B04B 5/12* (2013.01); *B01D 45/14* (2013.01); *B01D 45/16* (2013.01); *B04B 7/00* (2013.01); *B04B 7/02* (2013.01); *B04B 2005/125* (2013.01)

(58) Field of Classification Search
CPC ................................ B01D 45/14; B01D 45/16
(Continued)

(56) References Cited

U.S. PATENT DOCUMENTS 2,104,683 A * 1/1938 Van Rosen et al. ... B01D 45/14 494/68
9,931,646 B2 4/2018 Isaksson et al.
(Continued)

FOREIGN PATENT DOCUMENTS

CN 103796760 A 5/2014
CN 103917299 A 7/2014
(Continued)

OTHER PUBLICATIONS

Chinese Office Action and Search Report for Chinese Application No. 201580062996.1, dated Oct. 9, 2018, with Enolish translation.
(Continued)

*Primary Examiner* — Robert A Hopkins
(74) *Attorney, Agent, or Firm* — Birch, Stewart, Kolasch & Birch, LLP

(57) ABSTRACT

A centrifugal separator and a method for separation of particles from a gas stream is disclosed. The separator includes a frame, a gas inlet and a gas outlet. A centrifugal rotor is arranged to be rotatable in the frame around a rotational axis and includes a separating member. A central gas chamber in the rotor communicates with a radially inner portion of the separating member and the gas outlet. A space surrounding the rotor communicates with a radially outer portion of the separating member and the gas inlet. A drive provides rotation of the centrifugal rotor for separating particles from the gas stream being conducted from the space surrounding the rotor, through the separation member and towards the central gas chamber. A ring-formed sealing arranged between and in sealing contact with the first frame
(Continued)

portion and the centrifugal rotor. This improves the separation performance of a centrifugal separator for separation of particles from a gas stream, by reducing pressure losses and leakage from the central gas chamber.

20 Claims, 6 Drawing Sheets

(51) Int. Cl.

| | |
|---|---|
| ***B04B 5/12*** | (2006.01) |
| ***B04B 7/00*** | (2006.01) |
| ***B04B 7/02*** | (2006.01) |

(58) Field of Classification Search
USPC .......................................... 55/400, 404, 457
See application file for complete search history.

(56) References Cited

U.S. PATENT DOCUMENTS

| | | | |
|---|---|---|---|
| 2010/0011723 | A1 | 1/2010 | Szepessy et al. |
| 2014/0237963 | A1 | 8/2014 | Inge et al. |

FOREIGN PATENT DOCUMENTS

| | | | |
|---|---|---|---|
| GB | 1064465 | A | 4/1967 |
| RU | 2469796 | C2 | 12/2012 |
| WO | WO 2004/022239 | A1 | 3/2004 |
| WO | WO 2010/008342 | A2 | 1/2010 |
| WO | WO 2014/079832 | A1 | 5/2014 |

OTHER PUBLICATIONS

Russian Office Action and Search Report, dated Apr. 10, 2018, for Russian Application No. 2017121579, with English translations.

* cited by examiner

CENTRIFUGAL SEPARATOR

TECHNICAL FIELD

The present invention relates generally to a centrifugal separator and a method for separation of particles from a gas stream.

BACKGROUND

WO 2014/079832 A1 discloses a centrifugal separator plant for separating solid and liquid particles and/or mist from a gas mixture for obtaining a separated gas. The plant comprises a centrifugal separator with a stationary casing or a frame defining a separation space. The centrifugal separator comprises an inlet for the gas mixture, a gas outlet for the separated gas and an outlet for discharging separated solid and liquid particles. A rotor comprising a separating member for separating the gas mixture. A drive member is connected to the separating member via a spindle and rotates the rotor about an axis of rotation. Between frame and the rotor is a narrow gap.

Due to the lower pressure level at the gas outlet compared to the inside of the separator there will be a leakage flow through the gap, which reduces the separation performance of the separator.

SUMMARY

An object of the present invention is to improve the separation performance of a centrifugal separator for separation of particles from a gas stream, such as the type of centrifugal separator disclosed in the background art.

Thus the present invention relates to a centrifugal separator for separation of particles from a gas stream. Particles are defined as solid and/or liquid particles, such as oil droplets or oil mist. The centrifugal separator comprises a frame, a gas inlet and a gas outlet. A centrifugal rotor is arranged to be rotatable in the frame around a rotational axis and comprises a separating member. A central gas chamber is formed in the rotor and communicates with a radially inner portion of the separating member and the gas outlet. A space is surrounding the rotor and communicating with a radially outer portion of the separation member and the gas inlet. Drive means provides rotation of the centrifugal rotor for separating particles from the gas stream being conducted from the space surrounding the rotor, through the separation member and towards the central gas chamber. A ring-formed sealing is arranged between and in sealingly contact with the frame and the centrifugal rotor.

The plurality of separation plates may comprise a stack of frustoconical separation discs provided at mutual distances from one another, defining the separation passages between the discs and wherein each separation disc is provided with distance members extending from a radially inner portion of the separation disc to a radially outer portion of the separation disc to define the separation passages between the discs of the stack of frustoconical separation discs. Thus the rotation of the gas stream may efficiently be transferred to a rotation of the rotor upon spinning up of the rotating gas in the separation passages. The distance members may increase the efficiency by providing a function as vanes transferring rotational momentum from the gas to the rotor. The distance members may alternatively or additionally comprise distance members in the form of dot-shaped caulks or micro-caulks, distributed over the surface of the separation discs.

The separation plates may be formed in polymeric material or in metal, such as stainless steel.

The centrifugal separator may be configured to provide the rotor with a rotational speed in the range of 100-11000 rpm, preferably 1000-3000 rpm, during operation of the device and driven by the rotational flow of the gas stream. The separation is efficient even at relatively low rotational speeds.

The invention further relates to a method of separating particles from a gas stream, providing a centrifugal rotor rotatable arranged around a rotational axis (x) in a stationary frame and comprising a separating member, a central gas chamber in the rotor communicating with a radially inner portion of the separating member and a gas outlet, a space surrounding the rotor and communicating with a radially outer portion of the separating member and a gas inlet, bringing the rotor in rotation for separating particles from the gas stream, sealing off the rotor against the frame by a ring-formed sealing.

The gas stream may be a stream of fossil gas, natural gas, biogas, exhaust gas, ventilation gas, crankcase gas, carbon dioxide ($CO_2$), hydrogen sulfide ($H_2S$), etc.

The invention further relates to the use of a centrifugal separator as disclosed for separation of particles, such as solid or liquid particles from a stream of gas, such as a stream of fossil gas, natural gas, biogas, exhaust gas, ventilation gas, crankcase gas, carbon dioxide ($CO_2$), hydrogen sulfide ($H_2S$), etc, and/or applied to positions in gas compression, amine processes, Shell Claus off-gas treating (SCOT) processes, in exhaust gas scrubbing and the like.

BRIEF DESCRIPTION OF DRAWINGS

The invention is now described, by way of example, with reference to the accompanying drawings, in which.

DESCRIPTION OF EMBODIMENTS

Figure 1:
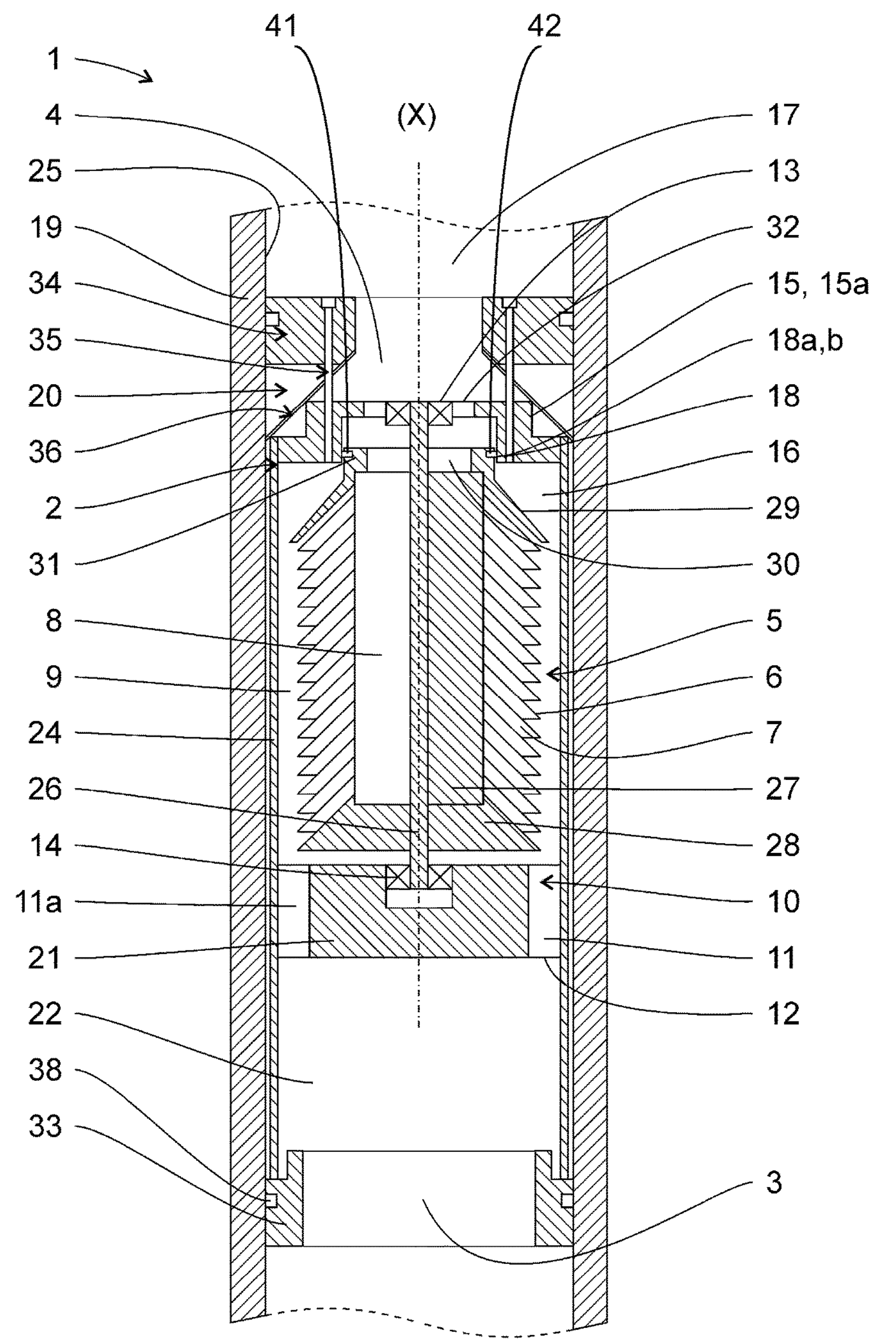
FIG. 1 shows a cross-section along the rotational axis of a centrifugal separator according to the invention, arranged in a cylindrical vessel for conveying a gas stream.

In FIG. 1 a centrifugal separator 1 for separation of particles from a gas stream is shown arranged in a cylindrical vessel 19 in the form of a cylindrical pipe for guiding the gas stream. The separator comprises a self-supporting frame 2 for mounting inside the vessel 19. Self-supporting is understood as an ability of the frame to support itself without relying on support from the vessel 19 such as during mounting and dismounting. The frame 2 is provided with a first partition 15 for dividing the vessel 19 into a first section

16 upstream of the first partition 15 and a second section 17 downstream of the first partition 15. The separator 1 further comprises a gas inlet 3 communicating with the first section 16 and a gas outlet 4 communicating with the second section 17.

Figure 2:
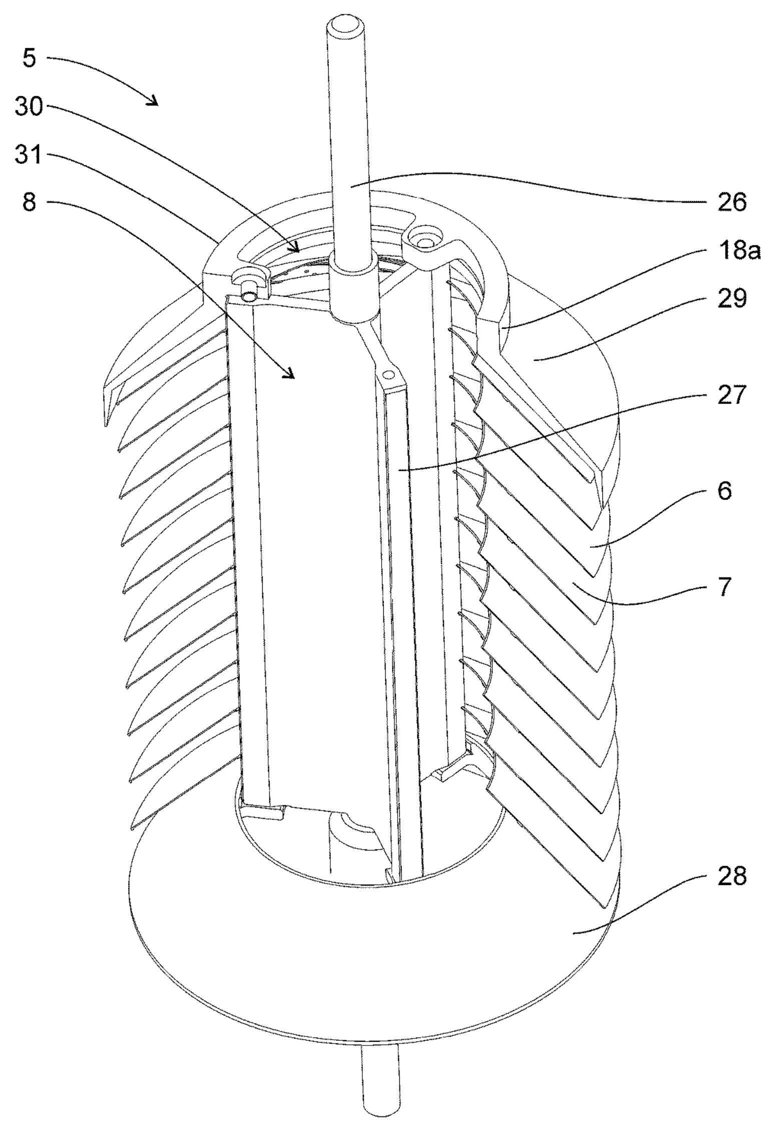
FIG. 2 shows a cross-section along the rotational axis of a centrifugal separator according to the invention, arranged in a cylindrical vessel for conveying a gas stream.

The centrifugal separator 1 further comprises a centrifugal rotor 5 arranged to be rotatable in the frame 2 around a rotational axis x. The rotational axis extends in the direction of the extension of the vessel 19. The rotor 5 comprises a shaft 26 having a first and a second end portion. The first end portion is supported in a first frame portion 15*a* by means of a first bearing 13. The first frame portion 15*a* comprises the first partition 15. The second end portion is supported in the frame 2 by means of a second bearing 14 held in a second frame portion 21. With reference to FIG. 2, the rotor 5 is described in more detail. The rotor 5 comprises a disc support structure 27 connected to the rotor shaft 26 and extending between the first and second end portions of the rotor shaft 26. The disc support structure 27 has three plate like wings extending along the rotor shaft 26 and radially outwards from the rotor shaft 26. In an alternative embodiment the disc support structure 27 comprises two or more wings, such as six wings. Towards the second end portion of the rotor shaft 26, a bottom disc 28 is attached to the wings of the disc support structure 27. On the bottom disc 28, and guided by the radially outer portions of the plate like wings, a plurality of frustoconical separation discs 6 are stacked. The separation discs 6 may be made of a lightweight material such as plastic, or of metal such as stainless steel. The separation discs 6 are each provided with distance members in order to provide separation passages 7 between the discs 6 in the stack. The distance members are in the form of elongated protrusions extending from a radially inner portion to a radially outer portion of each separation disc 6, having an extension along a line or a curve. The elongated distance members, or caulks, may be straight or curved and may be integrated in the discs 6 or attached to the discs 6. The distance members may alternatively or additionally comprise distance members in the form of dot-shaped caulks or microcaulks, distributed over the surface of the separation discs 6. On top of the stack of separation discs 6 a top disc 29 is provided. The top disc 29 is attached to the wings of the disc support structure 27. The stack of separation discs 6 are compressed by the top disc 29 and the bottom disc 28. Radially inside the separation discs 6 a central gas space 8 is formed, divided into three parts by the wings of the disc support structure 27. The top disc 29 is provided with a central opening 30 such that the central gas space 8 of the rotor 5 is open for passage of gas through the top disc 29. The top disc 29 is provided with a flange 31 circumventing the central opening 30 providing a cylindrical outer sealing surface, 18*a*. The separation discs 6 together with the disc support structure 27 and the bottom and top discs 28, 29 form together a separating member.

The central gas chamber 8 in the rotor 5 communicates with a radially inner portion of the separation passages 7 and the gas outlet 4 via the central opening 30 of the top disc 29 and openings 32 formed in the first partition 15, surrounding the first bearing 13. Further, a space 9 is formed radially outside and surrounding the rotor 5. The space 9 surrounding the rotor 5 communicates with the radially outer portion of the separation passages 7 and the gas inlet 3. The centrifugal separator 1 is configured such that the first and second sections 16, 17 of the vessel 19 communicate via the separation passages 7 of the rotor 5.

Again turning to FIG. 1, a narrow gap 18 is formed between a sealing surface 18*a* formed on the flange 31 of the top disc 29 and a corresponding cylindrical sealing surface 18*b* on the first partition 15. The gap 18 is sealed by a ring-formed sealing 41 which is a piston ring-like sealing, having a rectangular cross-section, and that is fixed through friction on the first partition 15. The sealing 41 is then in mechanical contact with the sealing surface 18*a* of the top disc 29.

Figure 8:
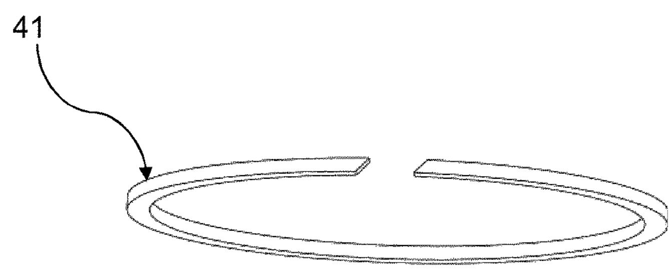
FIG. 8 shows a sealing according the invention.

The sealing 41, shown in FIG. 8, has a through cut which allows it to flex and move as it wears and also allows for circumferential expansion of the ring. The through cut should take into account both of these functions whilst allowing the minimum amount of leakage. The through cut may thus be angled or straight cut. The angled cut is preferred to avoid leakage but the straight cut is generally stronger. Which cut is used depends thus on the application or the preferred characteristics. The cut may instead be stepped.

The sealing 41 in this embodiment is manufactured so that the cut is wide. Thus when compressing the sealing 41 and mounting it on the first partition 15 the sealing 41 expands against the sealing surface 18*a*.

The sealing 41 runs free in a groove 42 in the top disc 29 with a small clearance and has an inner and an outer surface, facing the inside and the outside of the separator respectively. When the separator 1 is filled by the gas mixture to be separated the pressure difference between the outlet 4 and the space 9 presses the sealing 41 upwards or downstream with its outer surface against an upper surface of the groove 42 in the top disc 29 with increased tightness of the sealing 41 as a result. The groove 42 has a rectangular cross section but may in another embodiment have a cross-section that enables the gas pressure in the space 9 surrounding the rotor 5 to act on both the inner surface and a part of the outer surface of the sealing 41. By choosing the cross section, the relation between the forces acting on the surfaces of the sealing 41 may be controlled. As a complement or alternative the cross section of the sealing 41 may be chosen to enable the gas to act on both the inner surface and the part of the outer surface of the sealing 41 in a similar manner. The piston ring-like sealing 41, being arranged on the first partition 15 of the frame 2 will be stationary and thus will not rotate.

Figure 6:
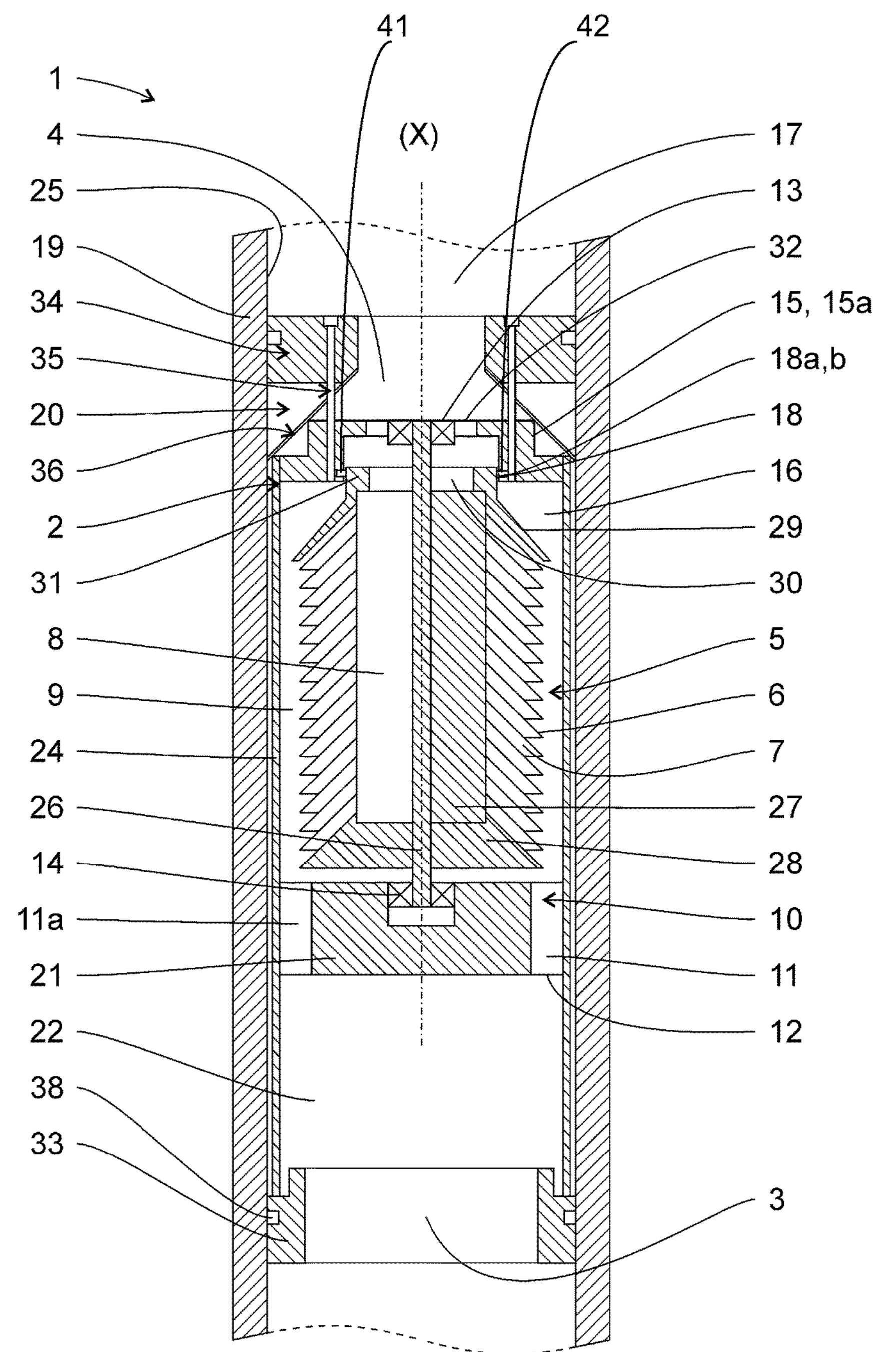
FIG. 6 shows a cross-section along the rotational axis of a centrifugal separator according to the invention, arranged in a cylindrical vessel for conveying a gas stream.
Figure 7:
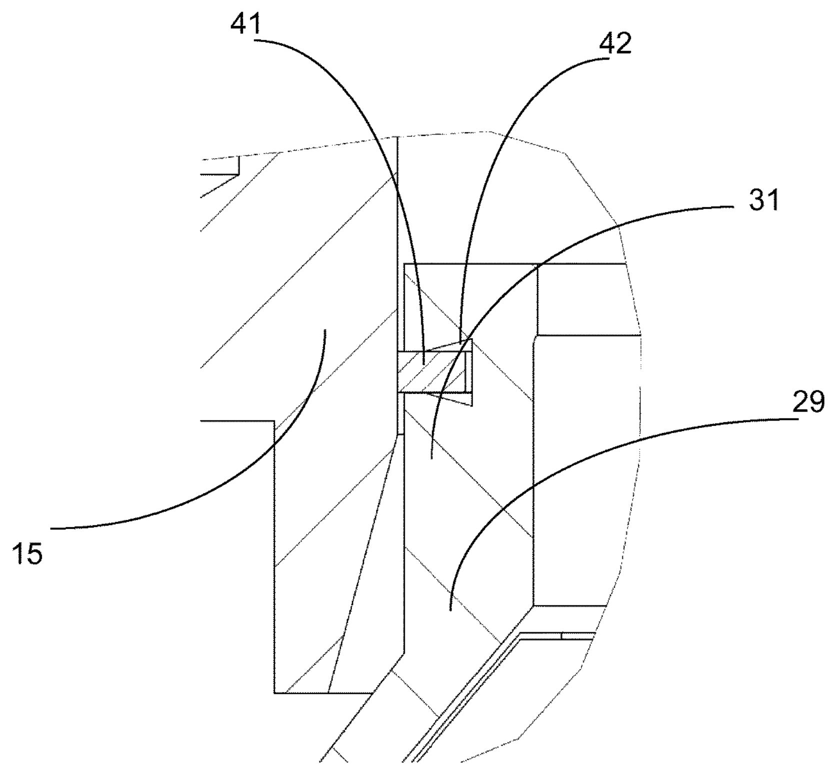
FIG. 7 shows a partially cut out view of the embodiment in FIG. 6 of the area of the separator where the sealing according the invention is arranged.

In another embodiment according to FIGS. 6 and 7 the gap 18 between the top disc 29 and the first partition 15 is sealed by a ring-formed piston ring-like sealing 41 which is fixed through friction on the flange 31 of the top disc 29 of the rotor. The sealing 41 runs free in a groove 42 in the first partition 15 with a small clearance and has an inner and an outer surface. When the separator 1 is filled by the gas mixture to be separated the pressure difference between the outlet 4 and the space 9 presses the outer surface of the sealing 41 upwards or downstream against an upper surface of the groove 42 in the first partition 15 with increased tightness of the sealing 41 as a result. The groove 42 may have a cross section that enables the gas pressure in the space 9 surrounding the rotor 5 to act on both the inner surface and part of the outer surface of the sealing 41. By choosing the cross section, the relation between the forces acting on the surfaces may be controlled. As a complement or alternative the cross section of the sealing 41 may be chosen to enable the gas to act on both the inner and the outer surfaces in a similar manner. The piston ring-like sealing 41 arranged on the top disc 29 will rotate with the separating member.

The sealing 41 in this embodiment is manufactured so that the cut ends of the sealing overlap. Thus when expanding the sealing 41 and mounting it on the rotor the sealing 41 compresses against the sealing surface 18*b*. The sealing 41 is then in mechanical contact with the sealing surface 18*b* of the first partition 15.

The piston-ring-like sealing 41 may be manufactured of cast iron or steel such as stainless steel and may be coated or treated to enhance the wear resistance. Instead the sealing 41 may be of ceramic materials or of a combination of all or some of the materials.

The frame 2 comprises a bottom sealing ring 33 forming the gas inlet 3 in the frame 2. The bottom sealing ring 33 is sealingly connected, 38, to the inner vessel wall 25. A cylindrical frame tube 24 extends along the inner wall of the vessel 19 as a part of the frame 2, from the bottom sealing ring 33 to the first partition 15 and connects with the other parts of the frame 2 to provide a self-supporting frame structure. The second frame portion 21 supporting the second bearing 14 is connected to and supported by the inner wall of the cylindrical frame tube 24.

Figure 3:
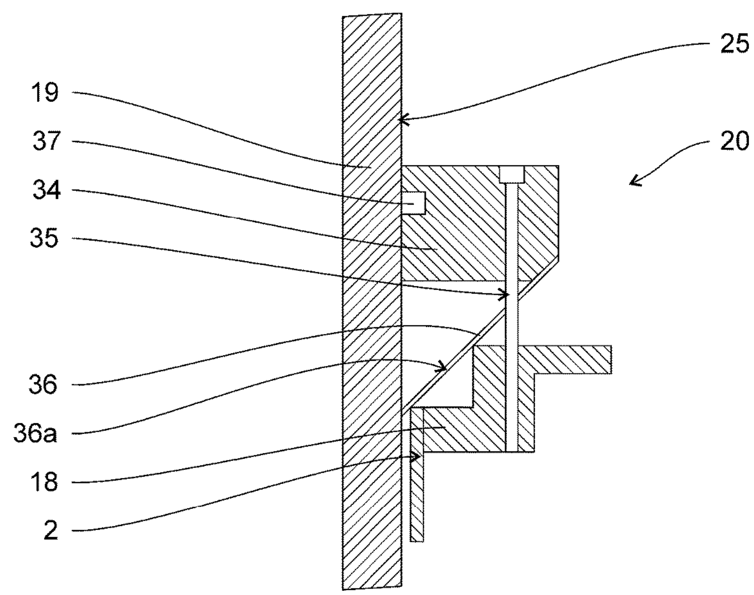
FIG. 3 shows an axial cross-section of a holding means with frustoconical slotted disc.

The frame 2 further comprises a holding means 20 to hold the frame 2 at a position inside the vessel 19. The holding means 20 comprises in a ring shaped part 34 sealingly connected, by means of a sealing member 37, to the inner vessel wall 25. The holding means 20 is configured to engage with the cylindrical inner surface of the vessel 19 by providing an expandable outer diameter. With reference to FIG. 3, the holding means 20 is described in more detail. The ring shaped part 34 is connected to the first partition 15 by a plurality of bolts 35 distributed around the circumference of the ring shaped part 34. The holding means 20 comprises one or more radially slotted frustoconical discs 36 mounted such that compression of the disc 36 by tightening the bolts 35 of the ring shaped part 34 causes slotted radially outer portions 36*a* of the disc 36 to expand and engage with the cylindrical inner surface of the vessel 19. Thus the expandable outer diameter is realized by tightening the compressive bolts 35.

Figure 4:
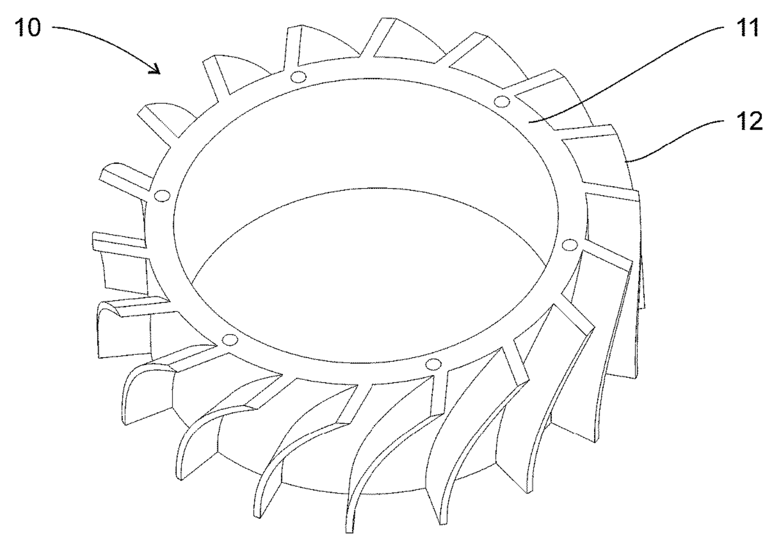
FIG. 4 shows a perspective view of a device configured to bring the gas stream in rotation.

Again with reference to FIG. 1, the centrifugal separator 1 comprises a stationary device 10 configured to bring the gas stream in rotation. The device 10 configured to bring the gas stream in rotation is positioned upstream of the rotor 5 and formed in the second frame portion 21. The device 10 comprises a ring shaped gas deflecting member 11 comprising a plurality of vanes 12 which are inclined with respect to the axial direction x of the centrifugal rotor 5 and distributed around the rotational axis. The vanes 12 are arranged in a passage 11*a* formed in the second frame portion 21 upstream of the rotor 5. The passage 11*a* extends radially outside the separation plates of the centrifugal rotor 5. With reference to FIG. 4, the device 10 configured to bring the gas stream in rotation is shown in further detail. The device 10 comprises a ring shaped gas deflecting member 11 comprising a plurality of vanes 12 extending outwardly from the ring shaped member 11 and distributed around the rotational axis of the rotor 5. The vanes 12 are inclined with respect to the axial direction of the rotor 5, which inclination is gradually increased along the length of the vanes 12 in the direction of the flowing gas.

According to one embodiment, the vanes 12 may be movable/or and the inclination of the vanes 12 may be adjusted during operation in order to control the speed of rotation of the gas stream.

Figure 5:
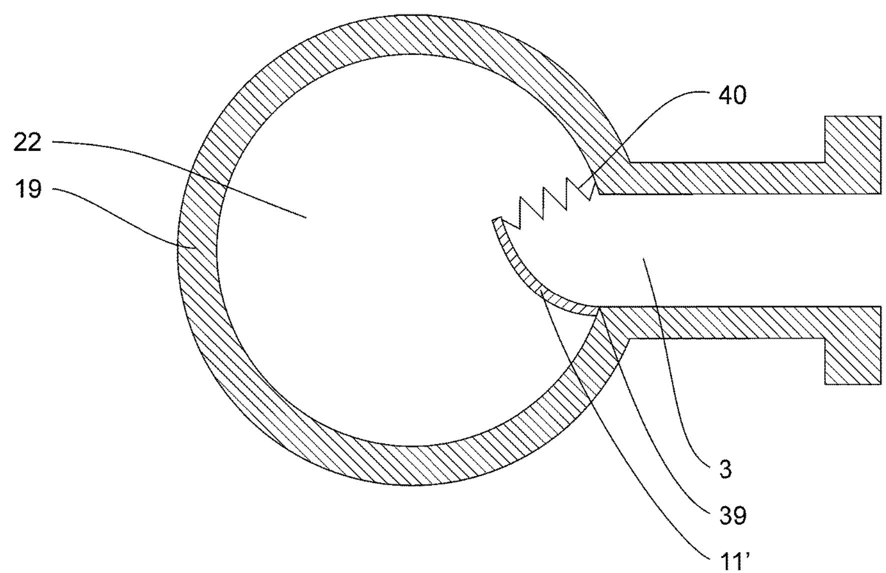
FIG. 5 shows a cross-section perpendicular to the rotational axis of a device configured to bring the gas stream in rotation according to another embodiment.

In addition to, or as an alternative to what is shown in FIG. 4, the gas inlet 3 upstream of the centrifugal rotor 5 may be arranged at a right angle to the rotational axis of the centrifugal rotor 5, as shown in FIG. 5. This figure shows a cross-section of the vessel 19, perpendicular to the rotational axis of the rotor 5, at the inlet side of the centrifugal separator 1. It is preferred to connect external pipe connections at right angles in order to withstand high pressure in the vessel 19. In this embodiment, the device 10 configured to bring the gas stream in rotation upstream of the rotor 5 comprises an inlet gas deflecting member 11' which is arranged to deflect the gas stream from the gas inlet 3 towards a tangential direction of the centrifugal rotor 5. The inlet gas deflecting member 11' may be stationary or pivotally connected to the vessel 19 and may be slanted or bent such that gas flowing through the inlet 3 is deflected towards a tangential direction of the centrifugal rotor 5, thus achieving a rotational flow of the gas stream in the vessel 19. The position or inclination of the deflecting member 11' may be adjusted during operation of the separator 1 such that to control the rotational speed of the gas stream. As shown, this may be achieved by the inlet gas deflecting member 11' being pivotally connected to the vessel 19 at a point 39, and biased towards an initial position by means of a spring 40. The spring 40 may be integrated with the inlet gas deflecting member 11' at the pivot point 39 or connecting the inlet gas deflecting member 11' to another point of the vessel 19. At an increasing flow of gas the inlet gas deflecting member 11' is deflected by the gas flow, which may result in a limitation of the speed of rotation of the gas in the vessel 19.

With reference to FIG. 1, the separator 1 is mounted in the vessel 19 by placing the separator 1 with its self-supporting frame 2 inside the vessel 19, at a desired position inside the vessel 19, and expanding the diameter of the holding means 20 so that the holding means 20 engage with the inner surface 25 of the vessel 19, to hold the separator 1 at the desired position inside the vessel 19.

During operation of the centrifugal separator 1 a stream of gas enters into the inlet 3 of the centrifugal separator 1. The stream of gas is forced into the passage 11*a* where the inclined vanes 12 deflect the gas towards a tangential direction of the rotor 5 of the separator 1. Thus the gas stream is brought into rotation by the vanes 12, and enters into the space 9 surrounding the rotor 5. In this space 9 a pre-separation occurs whereas larger particles in the form of solid particles and/or liquid droplets having a density larger than the gas in the gas stream are separated from the gas stream by means of centrifugal forces in the rotating gas stream and deposited on the inner surface of the cylinder 24.

From the space 9 surrounding the rotor 5, the rotating gas stream enters into the separation passages 7 formed between the separation discs 6 in the rotor 5. The rotor 5 is brought into rotation by the rotating gas stream by means of viscous forces acting on the separation discs 6 in the separation passages 7. The rotation of the rotor 5 is also facilitated by the elongated distance members of the disc stack working as vanes or turbine blades to improve the transfer of momentum from the gas stream to the rotor 5. Since the rotating gas stream is led from the radially outer portions of the separation passages 7 and towards the radially inner portions of the separation passages 7, the gas stream is spun up thanks to the conservation of angular momentum. Thus the transfer of the rotation from the gas to the rotor 5 is particularly efficient in this configuration.

In the separation passages 7, particles in the form of solid particles and/or liquid droplets having a density larger than the gas in the gas stream are separated from the gas stream by centrifugal forces. Due to the smaller separation distances in the separation passages 7 of the stack of frustoconical discs 6 this even allows for separation of smaller and/or less dense particles from the gas stream. Particles separated from the gas stream are deposited on the inner surface of the frustoconical separation discs 6 and transported radially outwardly by means of centrifugal forces. From the radially outer edge of the separation discs 6, particles separated from the gas stream in the separation passages 7 are thrown towards and deposited at the inner surface of the cylinder 24.

Thus the rotational flow of the gas mixture alone drives the rotation of the centrifugal rotor 5, without a drive motor driving the rotor 5. The resulting rotation causes separation of particles from the same gas stream. Cleaned gas conducted towards the central gas chamber 8 of the rotor 5 is provided to the outlet 4 through the passages 30 and 32 formed in the rotor 5 and the first partition 15, and transported from the separator 1 through the vessel 19.

Instead of arranging a centrifugal separator 1 in a vessel 19 according to FIG. 1 the separator 1 may be arranged to be a free standing unit. The frame 2 of the separator 1 then has an inlet with connections for the gas to be cleaned upstreams of the separating member and an outlet with connections for the cleaned gas downstream of the separating member.

Instead of a drive means where the streaming gas is driving the rotor a drive motor may be coupled to the shaft. The drive motor may be electric or driven by some external fluid source.

Instead of a frustoconical discs the separating member may be comprised of a plurality of vertical plates connected to the shaft centrally and extending radially with or without an inclination. The separating member may instead be one rotating screw formed member arranged on the shaft.

The invention claimed is:

1. A centrifugal separator for separation of particles from a gas stream, comprising:

a frame comprising a first frame portion, a gas inlet and a gas outlet arranged in the first frame portion;

a centrifugal rotor arranged to be rotatable in the frame around a rotational axis and comprising a separating member, and a central gas chamber in the rotor communicating with a radially inner portion of the separating member and the gas outlet;

a space surrounding the rotor and communicating with a radially outer portion of the separation member and the gas inlet;

a drive providing rotation of the centrifugal rotor for separating particles from the gas stream being conducted from the space surrounding the rotor, through the separation member and towards the central gas chamber; and a ring-formed sealing arranged between and in sealing contact with the first frame portion and the centrifugal rotor.

2. The centrifugal separator according to claim 1, wherein the ring-formed sealing is arranged on either the first frame portion or on the rotor by friction.

3. The centrifugal separator according to claim 1, wherein the ring-fottned sealing has an inner surface facing the space and an outer surface facing the outlet and runs free in a groove in either the rotor or in the first frame portion with a small clearance.

4. The centrifugal separator according to claim 1, wherein the groove or the sealing has a cross section that enables the pressure in the space surrounding the rotor to act on said inner surface and partly on said outer surface.

5. The centrifugal separator according to claim 1, wherein the ring-formed sealing is manufactured at least partly of a ceramic material.

6. The centrifugal separator according to claim 1, wherein the separating member comprises a plurality of separation discs.

7. The centrifugal separator according to claim 1, wherein the rotor has a first and a second axial end portion, and wherein the rotor is rotatably supported in the frame by a first bearing at the first axial end portion and a second bearing at the second axial end portion.

8. The centrifugal separator according to claim 1, wherein the frame is configured to be mountable inside a vessel for guiding the gas stream, and comprises a first partition for dividing the vessel into a first section upstream of the first partition and a second section downstream of the first partition, wherein the gas inlet is communicating with first section, the gas outlet is communicating with second section, and wherein the centrifugal separator is configured such that the first and second sections communicate via separation passages of the rotor.

9. The centrifugal separator according to claim 1, wherein the frame is a self-supporting frame for mounting inside an existing vessel for guiding the gas stream, and wherein the frame comprises a holder configured to hold the frame at a position inside the vessel.

10. The centrifugal separator according to claim 6, wherein the plurality of separation discs comprises a stack of frustoconical separation discs provided at mutual distances from one another, defining separation passages between the discs, and wherein each separation disc is provided with distance members extending from a radially inner portion of the separation disc to a radially outer portion of the separation disc to define the separation passages between the discs of the stack of frustoconical separation discs.

11. A method of separating particles from a gas stream, comprising:

providing a centrifugal rotor rotatable arranged around a rotational axis in a stationary frame and comprising a separating member, a central gas chamber in the rotor communicating with a radially inner portion of the separating member and a gas outlet, and a space surrounding the rotor and communicating with a radially outer portion of the separating member and a gas inlet;

bringing the rotor in rotation for separating particles from the gas stream; and sealing off the rotor against the frame by a ring-formed sealing.

12. A method of separating particles from a gas stream comprising:

providing a centrifugal rotor rotatable arranged around a rotational axis in a stationary frame by sealing the centrifugal rotor to the frame by ring-formed sealing, the centrifugal rotor comprising a separating member, a central gas chamber in the rotor communicating with a radially inner portion of the separating member and a gas outlet, and a space surrounding the rotor and communicating with a radially outer portion of the separating member and a gas inlet; and separating particles, including solid or liquid particles from a stream of gas, including a stream of fossil gas, natural gas, biogas, exhaust gas, ventilation gas, crankcase gas, carbon dioxide (CO2), hydrogen sulfide (H2S), or applied to positions in gas compression, amine processes, Shell Claus off-gas treating (SCOT) processes, in exhaust gas scrubbing.

13. The centrifugal separator according to claim 2, wherein the ring-foiiiied sealing has an inner surface facing the space and an outer surface facing the outlet and runs free in a groove in either the rotor or in the first frame portion with a small clearance.

14. The centrifugal separator according to claim 2, wherein the ring-formed sealing is manufactured at least partly of a ceramic material.

15. The centrifugal separator according to claim 3, wherein the ring-formed sealing is manufactured at least partly of a ceramic material.

16. The centrifugal separator according to claim 4, wherein the ring-formed sealing is manufactured at least partly of a ceramic material.

17. The centrifugal separator according to claim 2, wherein the separating member comprises a plurality of separation discs.

18. The centrifugal separator according to claim 3, wherein the separating member comprises a plurality of separation discs.

19. The centrifugal separator according to claim 2 wherein the rotor has a first and a second axial end portion, and wherein the rotor is rotatably supported in the frame by means of a first bearing at the first axial end portion and a second bearing at the second axial end portion.

20. The centrifugal separator according to claim 3 wherein the rotor has a first and a second axial end portion, and wherein the rotor is rotatably supported in the frame by means of a first bearing at the first axial end portion and a second bearing at the second axial end portion.

* * * * *